UNITED STATES PATENT OFFICE.

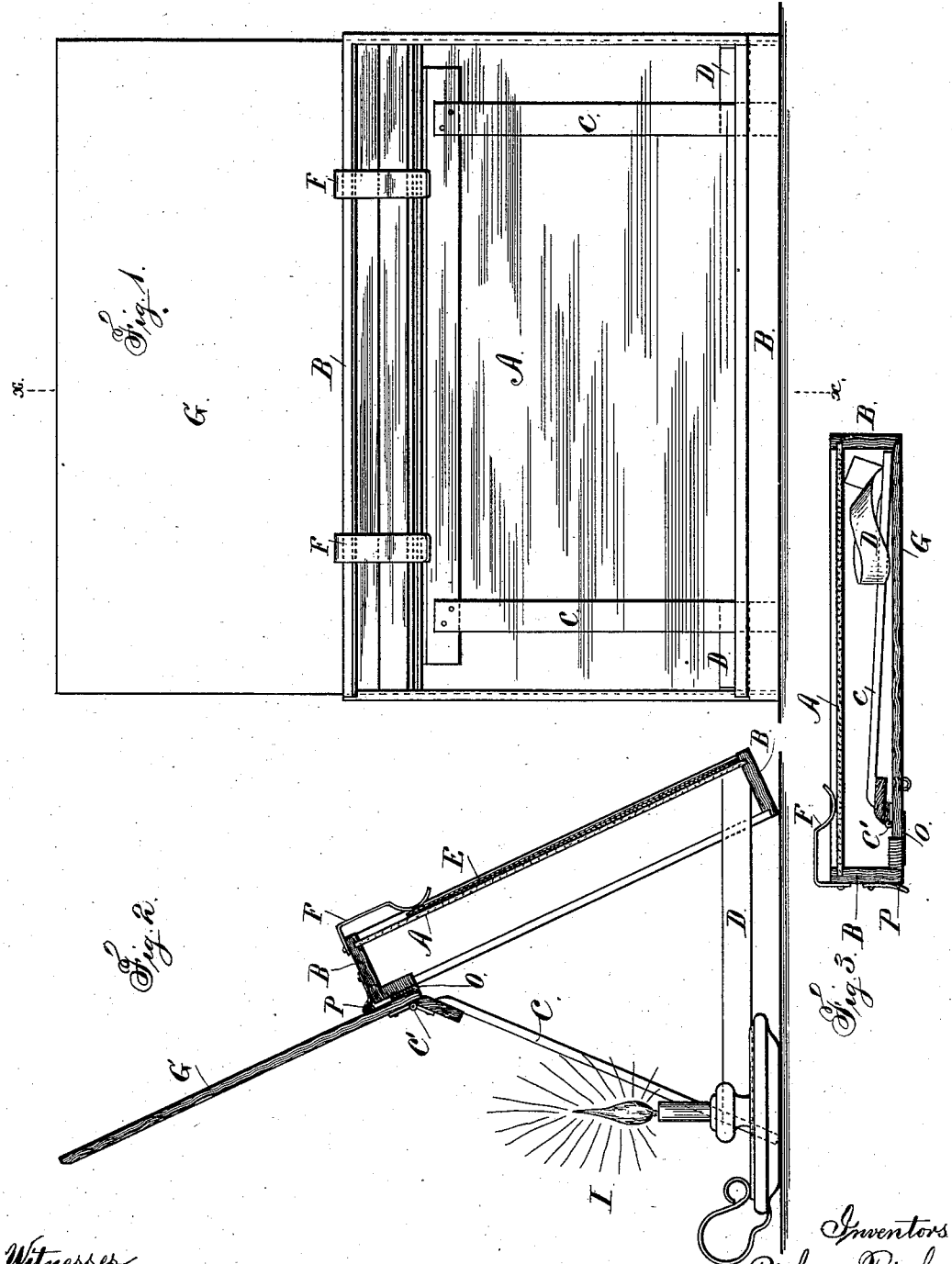

RICHARD RINK, OF BREWSTER, AND MARK E. SANDFORD, OF NEW YORK, N. Y.

DRAWING-EASEL.

SPECIFICATION forming part of Letters Patent No. 365,634, dated June 28, 1887.

Application filed February 28, 1887. Serial No. 229,130. No model.

*To all whom it may concern:*

Be it known that we, RICHARD RINK, of Brewster, in the county of Putnam and State of New York, and MARK E. SANDFORD, of the city and State of New York, have invented an Improvement in Drawing-Easels, of which the following is a specification.

Slates have heretofore been made with a ground glass upon the pattern or picture to be copied; but the thickness of the glass between the picture and the surface upon which the drawing is made renders it difficult to accurately produce the picture or pattern. In this case one picture has to be rubbed out before a second one is drawn, and upon the ground glass this is difficult to do.

The object of our present invention is to provide a cheap and reliable means for learners in drawing, whereby the copy is made upon a piece of paper laid directly upon the pattern or picture, the latter being followed with accuracy and distinctness, the light being transmitted from behind through both thicknesses of paper; and with this object in view we provide an easel that supports a plate of glass in a sloping position, so that the pattern and paper will rest against the glass, and the light will shine through the glass and through the paper, and the pattern and picture are held in their proper relation upon the glass while the drawing is being made; and we provide a shield that prevents the light shining above the glass and into the eyes of the person that is drawing, so that the picture can be seen more perfectly by the transmitted light. According to our improvement the picture drawn can be preserved.

In the drawings, Figure 1 is an elevation of the easel and the paper for the picture. Fig. 2 is a vertical section at the line $x\ x$, and Fig. 3 is a section of the parts as folded for transportation.

The plate of glass A is supported in an inclined position upon an easel, and it is preferable to make this easel as a frame, B, having slides that receive the edges of the glass; and C are the legs that support the easel, and they are preferably hinged at C' and provided with tapes or flexible connections D, between the legs and the supports for the glass, so that the glass may be rigidly supported by the easel in an inclined position, and upon this glass is placed a picture, pattern, or design drawn or printed upon paper, and upon this is placed the sheet of drawing-paper E, and by preference one or more clamps are applied at F to hold the paper and pattern together and to press them against the glass.

We prefer to use a shield, G, made of thin board or other opaque material, rising above the glass, so as to intercept the rays of light and shield the eyes of the person making the drawing, and it will be understood that light from a lamp or candle, I, behind the glass will shine through the two thicknesses of paper, so that the lines of the pattern or picture can be accurately followed in making the drawing.

The hinges for the legs C are represented as connecting the legs to the back of the shield G, so that said legs can be swung into the frame, as shown in Fig. 3, when the parts are folded, and the shield G is hinged at O to the frame, and there is a hook, P, that connects the shield to the frame, so as to hold up the former in the position indicated in Figs. 1 and 2. When this hook is disconnected, the shield can be swung downwardly, and forms a back or cover to the box within which the legs fold, and there is also room in this box for the reception of sheets of drawing-paper, and the printed patterns or pictures and pencils may also be placed in the same box.

We claim as our invention—

1. The combination, with the glass upon which the drawing-paper and pattern are to be laid, of a frame for the glass, hinged legs for supporting the frame in an inclined position, and a receptacle and back forming a box for pencils and paper, substantially as specified.

2. The combination, with a glass upon which the drawing-paper and pattern or picture are to be laid, of an easel for supporting such glass, and a shield extending above the glass and supported by the easel, substantially as set forth.

3. The combination, with the glass upon which the drawing-paper and pattern are to be laid, of a frame supporting the glass, legs hinged at their upper ends and adapted to swing into the frame in folding the parts, and the hinged shield adapted to form the back of the box, and a hook for holding the same when swung up above the glass, substantially as set forth.

Signed by us this 15th day of February, 1887.

RICHD. RINK.
MARK E. SANDFORD.

Witnesses as to signature of Richard Rink:
JOHN M. SLOANE,
OBED B. TOWNSEND.

Witnesses as to signature of Mark E. Sandford:
GEO. T. PINCKNEY,
WILLIAM G. MOTT.